United States Patent [19]

Mashimo et al.

[11] Patent Number: 5,045,138
[45] Date of Patent: Sep. 3, 1991

[54] METHOD OF FORMING POWER TRANSMISSION BELT TENSILE CORD

[75] Inventors: Satoshi Mashimo, Akashi; Yoshio Yamaguchi, Hyogo; Kazuhiro Takeda, Hyogo; Koji Kitahama, Hyogo, all of Japan

[73] Assignee: Mitsuboshi Belting Ltd., Japan

[21] Appl. No.: 40,563

[22] Filed: Apr. 20, 1987

[30] Foreign Application Priority Data

Apr. 23, 1986 [JP] Japan .................. 61-95676

[51] Int. Cl.$^5$ .............................. B29C 65/48
[52] U.S. Cl. .................. 156/137; 156/161; 156/229; 156/315; 156/910
[58] Field of Search ............. 156/137, 161, 166, 229, 156/315, 910, 180; 474/260, 261; 152/451, 565; 264/136, 137, 211.5, 291; 57/7, 251, 297, 902; 428/395, 396

[56] References Cited

U.S. PATENT DOCUMENTS

| | | | |
|---|---|---|---|
| 3,060,078 | 10/1962 | Atwell | 156/910 |
| 3,222,238 | 12/1965 | Krysiak | 156/315 |
| 3,436,288 | 4/1969 | Patterson | 156/910 |
| 3,469,001 | 9/1969 | Keefe | 264/290.5 |
| 3,665,994 | 5/1972 | Kovac et al. | 152/451 |
| 3,854,515 | 12/1974 | Takemura et al. | 152/527 |
| 4,522,614 | 6/1985 | Matsuoka et al. | 474/260 |
| 4,710,155 | 12/1987 | Matsuoka et al. | 156/137 |
| 4,715,176 | 12/1987 | Mashimo et al. | 156/137 |
| 4,849,149 | 7/1989 | Miyoshi et al. | 264/210.7 |

FOREIGN PATENT DOCUMENTS

| | | | |
|---|---|---|---|
| 0159711 | 4/1985 | European Pat. Off. | |
| 50578 | 12/1980 | Japan | |
| 161119 | 10/1982 | Japan | |
| 0053736 | 3/1984 | Japan | 152/451 |
| 231044 | 11/1985 | Japan | |

OTHER PUBLICATIONS

Yabuki et al., "Microstructure of Poly(ethylene Terephthalate) Tire Yarn and its Relation to Heat Generation in Rubber", Textile Research Journal, vol. 56, No. 1, Jan. 1986, pp. 41–48.

Celanese Fibers Marketing Company, Celanese Corporation ©1980, 1982 by Celanese Corporation, entitled Fortrel® Type 111 Polyester, issued Nov. 1982.

Primary Examiner—Caleb Weston
Assistant Examiner—Steven D. Maki
Attorney, Agent, or Firm—Wood, Phillips, Mason, Recktenwald & Vansanten

[57] ABSTRACT

A tensile cord manufacture wherein polyester multifilament cords are heat treated and drawn to provide tensile cords for use in power transmission belts. Preselected characteristics of the original cord, parameters of heat treating and drawing, and characteristics of the formed tensile cords required to provide the improved features of the invention are set forth.

7 Claims, 3 Drawing Sheets

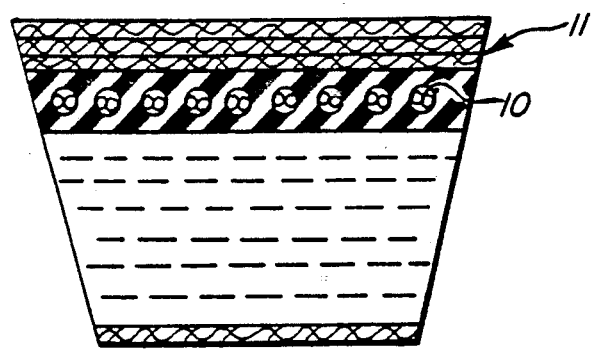
FIG. 1
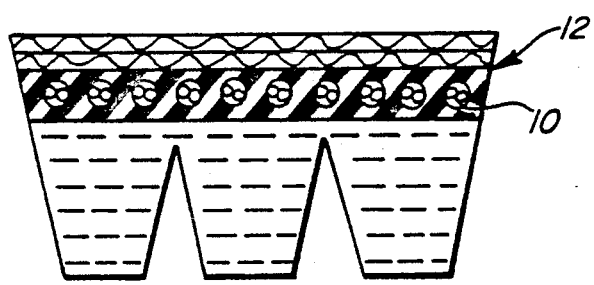
FIG. 2
FIG. 4
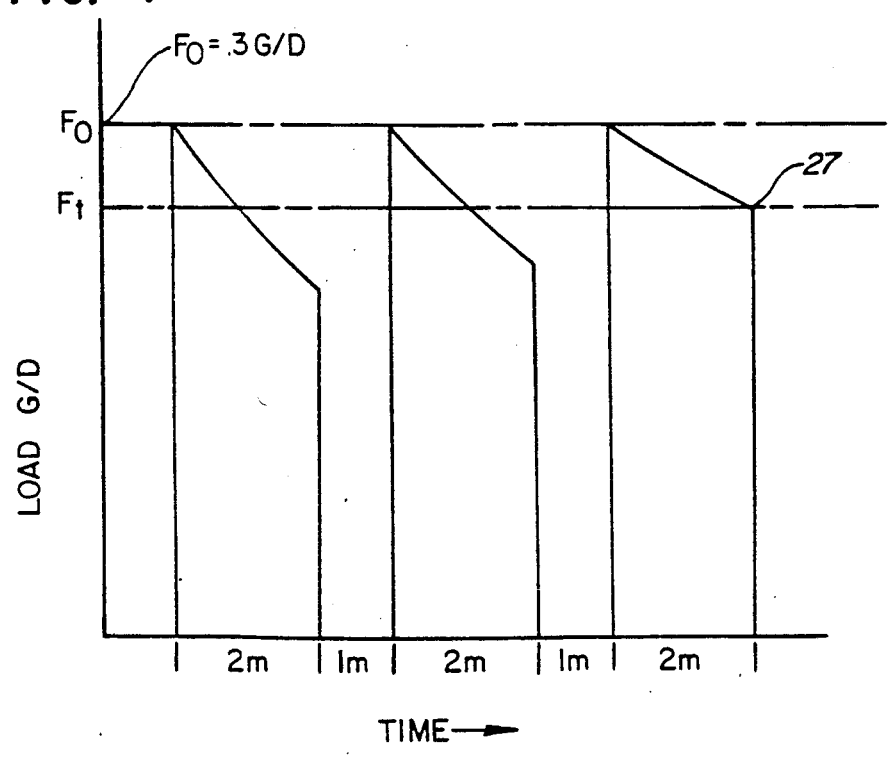

METHOD OF FORMING POWER TRANSMISSION BELT TENSILE CORD

TECHNICAL FIELD

This invention relates to power transmission belts and in particular to the manufacture of tensile cords for use in such power transmission belts.

BACKGROUND ART

In the conventional power transmission belt, such as an automotive fan belt, the looped belt is provided with longitudinally extending tensile cords. Such belts are conventionally formed of resilient material, such as rubber, and the tensile cords are formed of relatively low stretch, high strength materials.

One known material for use in such tensile cords is polyester synthetic resin. An excellent example of such a synthetic resin advantageously adapted for such use is the polyester filament yarn sold by Celanese Corporation under the trademark Fortrel®. One form of such Fortrel® polyester resin manufactured and sold by Celanese Corporation is identified as the Type 111 polyester and has been utilized as tensile cords in such power transmission belts, as discussed above.

The use of polyester tensile cords in power transmission belts is disclosed in U.S. Pat. No. 4,522,614 of Hiroshi Matsuoka et al. As disclosed in that patent, an automatic tension-maintaining power transmission belt is formed by embedding polyester fiber cord having high relative viscosity and subjected to hot stretching prior to the embedment thereof in the rubber of the belt.

DISCLOSURE OF INVENTION

The present invention comprehends an improved tensile cord manufacture wherein polyester multifilament yarn having an ultimate viscosity of less than 0.90 are coated with adhesive and then drawn at a temperature in the range of approximately 220° to 240° C. so as to elongate the yarns approximately 1 to 5%.

The tensile cord of the invention has a Young's modulus of more than 120 grams per denier, a thermal stress greater than 0.49 grams per denier when heated to 150° C. for 8 minutes, and a stress ratio of greater than 0.920 when the cord is removed from a vulcanized rubber power transmission belt.

More specifically, the invention comprehends such a power transmission belt tensile cord having a Young's modulus of more than 110 grams per denier, a thermal stress greater than 0.48 grams per denier when heated to 150° C. for 8 minutes, and a stress ratio of greater than 0.925 before the cord is embedded in the vulcanized rubber power transmission belt.

The illustrated cord has less than 3.5% shrinkage under dry heat when heated to 150° C.

In the manufacture of the cord, either epoxy resin or isocyanate is applied to the cord, whereupon the cord is heated to a temperature in the range of approximately 60° to 100° C. before being impregnated with resorcinol-formalin-latex solution.

The polyester cord has an ultimate viscosity in the range of approximately 0.75 to 0.90, an original double refraction ratio in the range of approximately 0.16 to 0.195, a Young's modulus in the range of approximately 50 grams per denier to 106 grams per denier, an original thermal stress in the range of approximately 0.10 to 0.60 grams per denier when heated to a temperature of 150° C. for 8 minutes, an original stress ratio of approximately 0.85 to 0.91 with a load of 3 grams per denier applied for 2 minutes, an original shrinkage under dry heat of approximately 4.0% to 9.0% when heated to a temperature of 150° C. for 30 minutes.

The drawn cord preferably has a Young's modulus of at least 110 grams per denier, a thermal stress of more than 48 grams per Denier when heated to 150° C. for 8 minutes, a stress ratio of more than 0.925 with a load of 3 grams per denier, a shrinkage under dry heat of less than 3.5% when heated to 150° C. for 30 minutes.

The tensile cord manufacture of the present invention is extremely simple and economical, while yet providing a highly improved tensile cord for use in power transmission belts and the like.

BRIEF DESCRIPTION OF THE DRAWING

Other features and advantages of the invention will be apparent from the following description taken in connection with the accompanying drawing wherein:

FIG. 1 is a transverse section of a power transmission belt having tensile cords embodying the invention;

FIG. 2 is a transverse section of a multiple rib V-belt having tensile cords embodying the invention;

FIG. 4 is a graph illustrating the change in the stress ratio resulting from sequential loading of the cord with a load of 3 grams/denier;

BEST MODE FOR CARRYING OUT THE INVENTION

Figure 3:
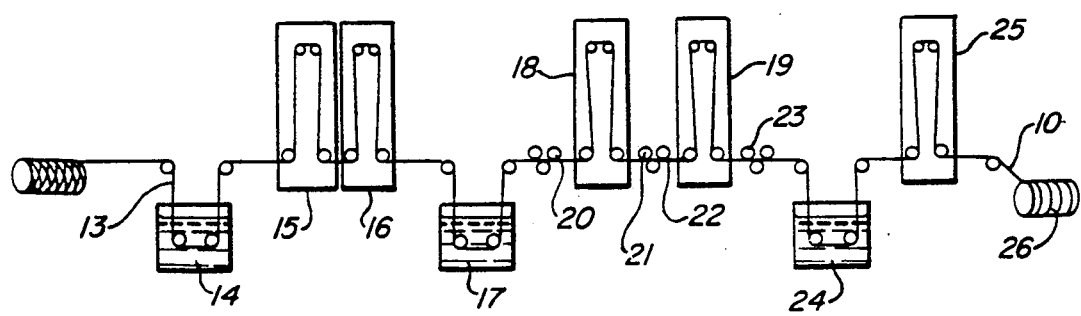
FIG. 3 is a schematic diagram illustrating the steps of manufacture of the tensile cord embodying the invention.

In the illustrative embodiment of the invention as disclosed in the drawing, a tensile cord generally designated 10 is shown for use in a power transmission V-belt generally designated 11 and in a multirib power transmission V-belt generally designated 12.

In addition, such tensile cords may be utilized in other forms of power transmission belts, such as flat belts, etc. In each of these different belts, the tensile cord provides a longitudinal strength in supporting the resilient body material of the belts, which conventionally comprises rubber. It is desirable that the tensile cords maintain their configuration notwithstanding the tendency for elongation thereof resulting from the power transmission operation. As such belts transfer power between the belt surfaces and the drive system pulleys by frictional engagement therebetween, stretching of the belts causes a lowering of the frictional forces, with undesirable slipping and loss of efficiency in the power transmission.

Such slippage further causes heating of the belt, resulting in early failure thereof. Thus, it is desirable to maintain the belt against undue stretching. The present invention comprehends an improved manufacture of the tensile cord notwithstanding high loads applied thereto and the heating thereof in the power transmission operation of the belt.

The present invention contemplates the forming of a tensile cord by providing a cord of twisted polyester filaments having an ultimate viscosity in the range of approximately 0.75 to 0.95. The tensile cord is treated in such a way as to cause the stress relaxation of the cord to be low and the degree of thermal stress to be relatively high. The cord of the present invention further has a high Young's modulus and a small shrinkage under dry heat. The tensile cords 10 of the present invention have a low stretch, high strength, and small dimensional change with time.

More specifically, the tensile cords of the present invention are formed of a polyester synthetic resin. Fibers of the polyester resin are twisted to form a cord 13 which is passed through a bath 14 of adhesive, such as isocyanate, epoxy, etc. The adhesive-coated cord is then passed through a pair of ovens 15 and 16 wherein the adhesive is dried.

The adhesive-coated cord is then passed through a bath of resorcinol-formalin-latex solution 17.

The RFL-coated cord is then passed through a pair of ovens 18 and 19 wherein the cord is heated and concurrently stretched by suitably varying the rate of rotation of the input roller 20 and output roller 21 in oven 18, and input roller 22 and output roller 23 in oven 19.

Oven 15 is preferably at a low temperature of approximately 65° C. and the cord is maintained within oven 15 for approximately 20 to 360 seconds and, more preferably, in the range of approximately 60 to 180 seconds. The cord is then passed to the second oven 16, which is maintained at a temperature in the range of approximately 60° to 100° C. for a period of time in the range of approximately 20 to 360 seconds, and preferably in the range of 60 to 180 seconds to effectively dry the coated cord. In the preferred embodiment, the isocyanate or epoxy is mixed with a solvent, such as toluene, which is effectively removed in the two-stage drying operation.

The RFL-coated cord is maintained in the oven 18 for a period of time in the range of 20 seconds to 360 seconds, and preferably, in the range of 60 seconds to 180 seconds. Oven 18 is maintained at a temperature in the range of approximately 220° to 240° C., and the draw ratio effected in oven 18 is in the range of approximately 0.5% to 2.0%, and preferably in the range of 1.0% to 1.7%.

The partially drawn cord is then delivered to oven 19 and maintained in that oven for approximately 20 seconds to 360 seconds, and preferably for a period of time in the range of approximately 60 seconds to 180 seconds. The draw ratio in oven 19 is similar to that in oven 18, namely, from 0.5% to 2.0%, and preferably in the range of approximately 1.0% to 1.7%.

The drawn cord, with the RFL solution completely dried thereon, is then passed to a bath of rubber cement 24, and then passed through a final oven 25 wherein it is retained for approximately 20 seconds to 360 seconds, and preferably in the range of approximately 60 seconds to 180 seconds, at a temperature in the range of approximately 100° to 200° C., and preferably in the range of approximately 150° to 180° C.

The completed tensile cord 10 is then wound on a suitable reel 26 for subsequent use in power transmission belts, such as belts 11 and 12 illustrated in FIGS. 1 and 2.

The initial twisted multifilament polyester cord 13 preferably has the following characteristics:

(a) an ultimate viscosity (eta) in the range of approximately 0.75 to 0.95;
(b) a double refraction ratio (delta n) in the range of approximately 0.16 to 0.195;
(c) a Young's modulus in the range of approximately 50 to 106 grams per denier;
(d) a thermal stress (150° C., 8 min.) in the range 0.10 to 0.60 grams per denier;
(e) a stress ratio (initial load 3 grams/denier for 2 min.) in the range of 0.85 to 0.91; and
(f) a shrinkage under dry heat of approximately 150° C. for 30 minutes in the range of approximately 4.0% to 9.0%.

The coated and drawn cord 10 delivered from oven 25 preferably has a Young's modulus of greater than 110 grams per Denier, a thermal stress 150° C. for 8 min.) of greater than 0.48 grams per denier, a stress ratio (initial load of 3 grams per denier) of greater than approximately 0.925, and a shrinkage under dry heat (150° C. for 30 min.) of less than approximately 3.5%.

The tensile cord further has, in accordance with the present invention, the following characteristics after it has been incorporated into a power transmission belt by vulcanization of the belt material. The cord 10, when removed from the vulcanized belt, preferably has a Young's modulus of greater than approximately 120 grams per denier, a thermal stress (150° C. for 8 min.) of greater than 0.490 grams per denier, and a stress ratio (initial load of 3 grams per denier) of greater than approximately 0.920.

Figures 6, 7:
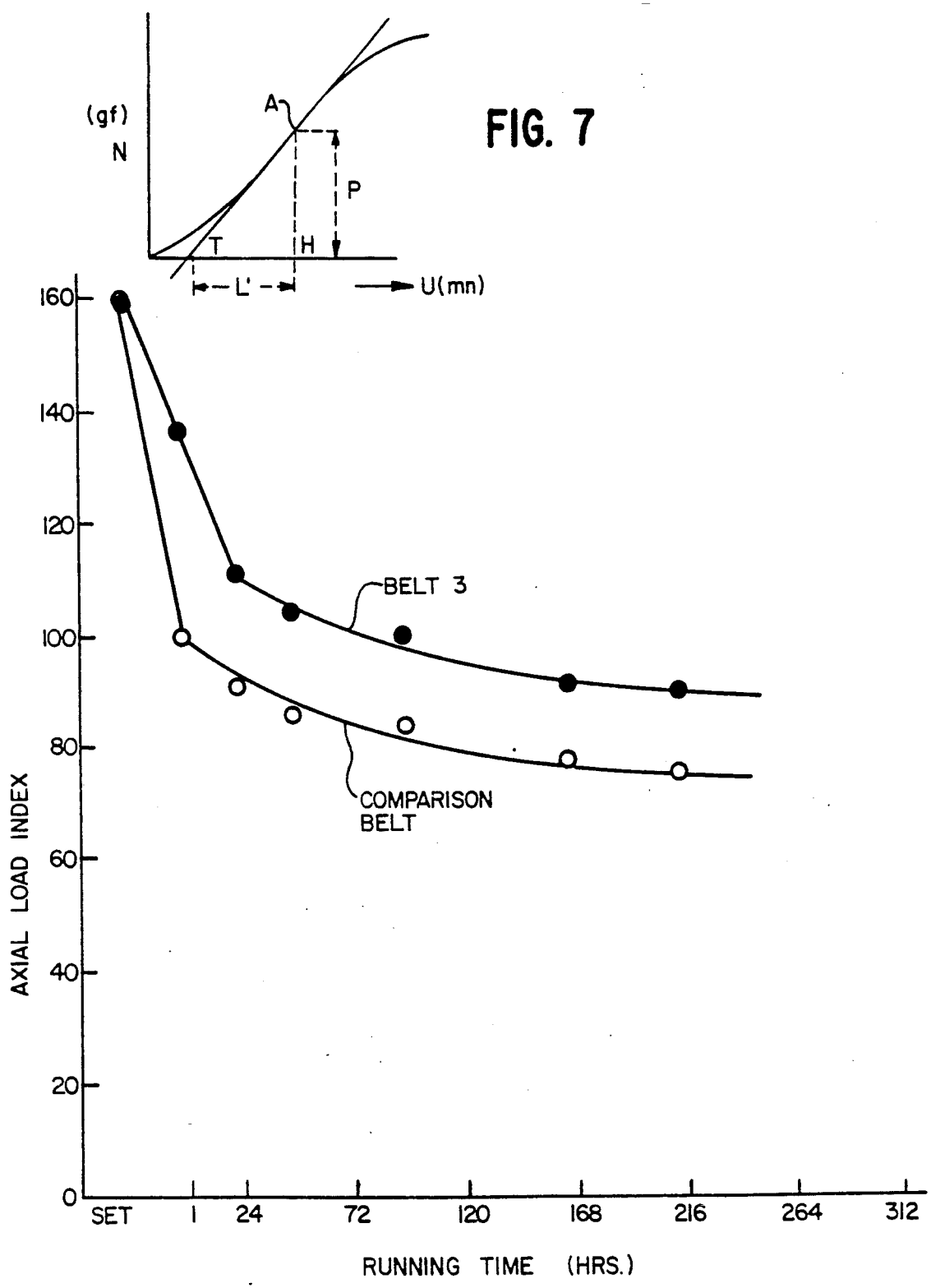
FIG. 6 is a graph illustrating the relationship between the belt running time and the axial load index.
FIG. 7 is a graph illustrating the Young's modulus test.

The Young's modulus characteristics set forth above were determined in accordance with the Japanese testing procedure identified as JIS L-1017 (1983). This testing procedure is similar to the U.S. standard ASTM D 885 M (1986) procedure, except that the initial modulus of grams per denier is equal to $$\frac{P}{\frac{L'}{L} \times D}.$$

where P is measured in grams per denier and is the load at the point of maximum tangency, as shown in FIG. 7, D is the nominal linear density, L is the length of the specimen in millimeters, and L' is the length of TH.

The thermal stress is determined by use of the Japanese standard test JIS L 1017 (1983), which is similar to the U.S. standard ASTM D 885 M (1986), but wherein the shrinkage force (grams per denier) is equal to $(F - F') \div D$, where F is the maximum force developed by the specimen in grams, F' is the pre-tension load in grams, and D is the nominal linear density.

The shrinkage under dry heat is determined by means of the Japanese standard JIS L 1017 (1983), which is similar to the U.S. standard ASTM D 885 M (1986), but wherein the shrinkage in percent equals $L - L' \div L \times 100$, where L is the initial length of the specimen and L' is the final length of the specimen.

The stress ratio determination is illustrated in FIG. 4. As shown therein, a load of 3 grams/denier is imposed on the cord for 2 minutes. The load is then removed for 1 minute. This sequence is repeated two additional times and the value of Ft at point 27 is determined 2 minutes after the weight is removed.

The power transmission efficiency of a power transmission belt is related to the Young's modulus and stress ratio, and for optimum operating conditions, it is preferred that the Young's modulus and the stress ratio be high. In the present invention, the Young's modulus is preferably greater than 120 grams/denier, and the stress ratio is greater than approximately 0.920. Further more specifically, it is desirable that the stress ratio be greater than 0.93.

A high thermal stress causes the belt to more tightly engage the pulley as a result of heat generated in the driving operation of the belt. Thus, as indicated above, the thermal stress, in accordance with the invention, of the tensile cords is preferably greater than 0.490 grams/denier at 150° C. and more specifically, is preferably greater than 0.52 grams/denier.

It is further desirable that the shrinkage under dry heat of the tensile cord prior to its use in the belt be low and, in the illustrated embodiment, the shrinkage under dry heat is preferably less than 3.5% and more specifically, less than approximately 3.3%.

Figure 5:
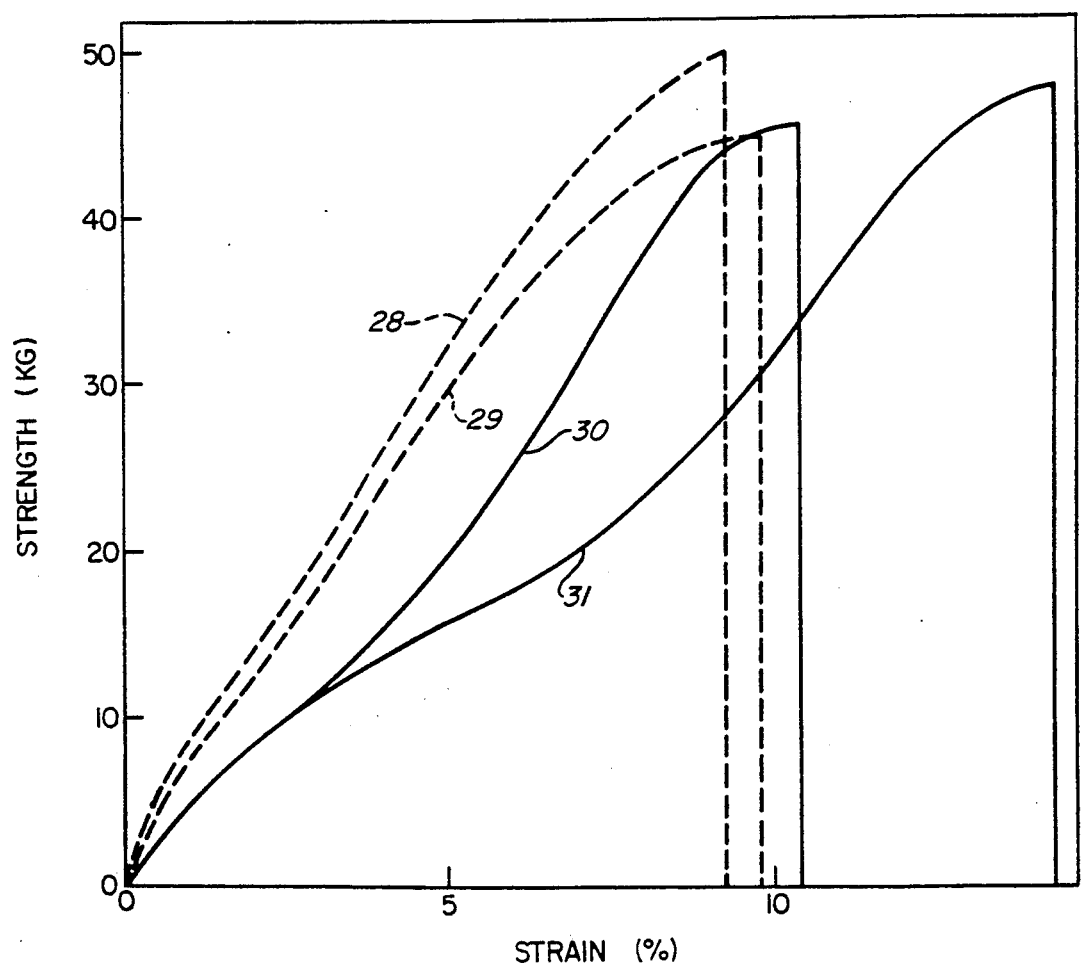
FIG. 5 is a graph showing the relationship between the strength and strain of a cord before and after treatment.

The characteristics are further illustrated in graphic form in FIGS. 5 and 6. In FIG. 5, the relationship between the strength and strain of the tensile cords is illustrated. This relationship is shown for the conventional cord and cord No. 3 of Table 2. Curve 31 illustrates the strength/strain characteristics of the conventional tensile cord, and curve 28 illustrates the characteristics thereof after being subjected to a heat treatment in accordance with the invention. Curve 30 illustrates the strength/strain characteristics of cord No. 3 before the heat treatment, and curve 29 illustrates the characteristics after subjection to the heat treatment of the present invention.

FIG. 6 illustrates the improved useful life of belt No. 3 as compared to that of the comparison belt. Thus, FIG. 6 shows the relationship between the axial load index of these two belts and the running time in hours, with the axial load measured after the conventional belt was run for 1 hours shown as 100 on the index scale. In running this test, the V-belts were entrained between a drive pulley having a pitch diameter of 107 mm. and a driven pulley having a pitch diameter of 100 mm., with a tension pulley having a pitch diameter of 70 mm. being engaged with the belts to maintain the tension thereof. The belts had a pitch line length of 1010 mm. originally, and the load imposed on the driven pulley on 8 ps. The driver pulley was run at 3600 rpm, and the ambient temperature was 25° C. The axial load imposed on the tension pulley was measured at the indicated times.

Tables 1 and 2 set forth below illustrate the characteristics of six different tensile cords made in accordance with the invention in comparison with a conventional tensile cord.

TABLE 1

| Cord | Pre-treatment | Adhesive | 1st & 2nd drawing and heat setting | Draw Ratio 1st % | Draw Ratio 2nd % | Young's Modulus G/D | Shrinkage under dry heat % | Thermal Stress 150° C. 31 min. G/D | Stress Ratio |
|---|---|---|---|---|---|---|---|---|---|
| 1 | Isocyanate | RFL | 220-240° C. | 1 | 1 | 126.2 | 3.0 | 0.500 | 0.928 |
| 2 | " | " | " | 1 | 1 | 123.8 | 3.0 | 0.485 | 0.929 |
| 3 | " | " | " | 1 | 1 | 124.4 | 3.2 | 0.488 | 0.929 |
| 4 | " | " | " | 1 | 1 | 121.6 | 3.2 | 0.492 | 0.932 |
| 5 | " | " | " | 1 | 1 | 113.8 | 3.2 | 0.502 | 0.929 |
| 6 | " | " | " | 1 | 1 | 128.4 | 3.1 | 0.503 | 0.933 |
| Conventional Cord | " | " | one stage 220°-240° C. | 4.0-6.0 | | 108.2 | 4.2 | 0.454 | 0.913 |

TABLE 2

| Belt | Cord | Young's Modulus of Cord Removed From Belt G/D | Stress Ratio of Cord Removed From Belt | Thermal Stress of Cord Removed From Belt G/D | Axial Load During Belt Running (1 hour) | Shrinkage Under Dry Heat of Belt | Shrinkage of Belt 60 Days After Vulcanization |
|---|---|---|---|---|---|---|---|
| 1 | 1 | 129.2 | 0.924 | 0.523 | 134 | 85 | 90 |
| 2 | 2 | 126.6 | 0.932 | 0.493 | 136 | 93 | 78 |
| 3 | 3 | 125.2 | 0.932 | 0.510 | 136 | 93 | 85 |
| 4 | 4 | 123.6 | 0.933 | 0.522 | 113 | 91 | 64 |
| 5 | 5 | 126.4 | 0.931 | 0.528 | 139 | 90 | 85 |
| 6 | 6 | 127.8 | 0.934 | 0.535 | 142 | 91 | 80 |
| Conventional Belt | Conventional Belt | 131.4 | 0.907 | 0.505 | 100 | 100 | 100 |

Thus, the tensile cord manufacture of the present invention provides a highly improved tensile cord for use in power transmission belts having substantially improved operating characteristics and maintained dimensional stability so as to provide long troublefree life of the power transmission belt in which it is incorporated. The improved results are obtained by a novel heat setting/drawing of a polyester cord having preselected characteristics. The characteristics of the tensile cord material before treatment and the characteristics thereof after being incorporated in a power transmission belt are preferably caused to be within parameters discussed above so as to provide the improved manufacture.

The foregoing disclosure of specific embodiments is illustrative of the broad inventive concepts comprehended by the invention.

We claim:

1. The method of forming a tensile cord for use in a power transmission belt, comprising the steps of:
providing a cord of twisted polyester multifilaments having an ultimate viscosity in the range of approximately 0.75 to 0.95, an original double refraction ratio in the range of approximately 0.16 to 0.195, an original Young's modulus in the range of approximately 50 grams/denier to 106 grams/denier, an original thermal stress in the range of approximately 0.10 to 0.60 grams/denier when heated to a temperature of 150° C. for 8 minutes, an original stress ratio of approximately 0.85 to 0.91 with a load of 3 grams/denier applied for 2 minutes, and an original shrinkage under dry heat of approximately 4.0% to 9.0% when heated to a temperature of 150° C. for 30 minutes;

applying adhesive to the cord;

drawing the cord in at least two steps at a temperature in the range of approximately 220° C. to 240° C. with a first draw ratio in the range of approximately 1.0% to 1.7% and a second draw ratio in the range of approximately 1.0% to 1.7% and setting the drawn adhesive-coated cord, wherein the drawn cord has a Young's modulus of at least 110 grams/denier, a thermal stress of more than 0.48 grams/denier when heated to 150° C. for 8 minutes and a stress ratio of more than 0.925 with a load of 3 grams/denier.

2. The method of forming a tensile cord of claim 1 wherein the drawn cord has a shrinkage under dry heat of less than 3.5% when heated to 150° C. for 30 minutes.

3. The method of forming a tensile cord of claim 1 wherein the drawn cord has a thermal stress of more than 0.52 grams/denier when heated to 150° C. for 8 minutes.

4. The method of forming a tensile cord of claim 1 wherein the drawn cord has a shrinkage under dry heat of less than 3.3% when heated to 150° C. for 30 minutes.

5. The method of forming a tensile cord of claim 1 wherein the drawn cord has a stress ratio of more than 0.93 with a load of 3 grams/denier.

6. The method of forming a tensile cord for use in a power transmission belt, comprising the steps of:

providing a cord of twisted polyester multifilaments having an ultimate viscosity in the range of approximately 0.75 to 0.95, an original double refraction ratio in the range of approximately 0.16 to 0.195, an original Young's modulus in the range of approximately 50 grams/denier to 106 grams/denier, an original thermal stress in the range of approximately 0.10 to 0.60 grams/denier when heated to a temperature of 150° C. for 8 minutes, an original stress ratio of approximately 0.85 to 0.91 with a load of 3 grams/denier applied for 2 minutes, and an original shrinkage under dry heat of approximately 4.0% to 9.0% when heated to a temperature of 150° C. for 30 minutes;

applying isocyanate to the cord;

drying the cord;

heating the cord to a temperature in the range of approximately 60° to 100° C.;

impregnating the cord with resorcinol-formalin-latex solution; and drawing the cord in at least two steps at a temperature in the range of approximately 220° C. to 240° C. with a first draw ratio in the range of approximately 1.0% to 1.7% and a second draw ratio in the range of approximately 1.0% to 1.7%; and setting the drawn adhesive-coated cord, wherein the drawn cord has a Young's modulus of at least 110 grams/denier, a thermal stress of more than 0.48 grams/denier when heated to 150° C. for 8 minutes and a stress ratio of more than 0.925 with a load of 3 grams/denier.

7. The method of forming a tensile cord for use in a power transmission belt, comprising the steps of:

providing a cord of twisted polyester multifilaments having an ultimate viscosity in the range of approximately 0.75 to 0.95, an original double refraction ratio in the range of approximately 0.16 to 0.195, an original Young's modulus in the range of approximately 50 grams/denier to 106 grams/denier, an original thermal stress in the range of approximately 0.10 to 0.60 grams/denier when heated to a temperature of 150° C. for 8 minutes, an original stress ratio of approximately 0.85 to 0.91 with a load of 3 grams/denier applied for 2 minutes, and an original shrinkage under dry heat of approximately 4.0% to 9.0% when heated to a temperature of 150° C. for 30 minutes;

applying an epoxy resin;

drying the cord;

heating the cord to a temperature in the range of approximately 60° to 100° C.;

impregnating the cord with resorcinol-formalin-latex solution; and drawing the cord in at least two steps at a temperature in the range of approximately 220° C. to 240° C. with a first draw ratio in the range of approximately 1.0% to 1.7% and a second draw ratio in the range of approximately 1.0% to 1.7%; and setting the drawn adhesive-coated cord, wherein the drawn cord has a Young's modulus of at least 110 grams/denier, a thermal stress of more than 0.48 grams/denier when heated to 150° C. for 8 minutes and a stress ratio of more than 0.925 with a load of 3 grams/denier.

* * * * *